United States Patent
Proksa et al.

(10) Patent No.: US 6,288,542 B1
(45) Date of Patent: Sep. 11, 2001

(54) MAGNETIC RESONANCE IMAGING METHOD FOR MEDICAL EXAMINATIONS

(75) Inventors: Roland Proksa; Volker Rasche; Ralph Sinkus, all of Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/273,209

(22) Filed: Mar. 19, 1999

(30) Foreign Application Priority Data

Mar. 20, 1998 (DE) .............................................. 198 12 285

(51) Int. Cl.[7] .............................. G01V 3/00; A61B 5/055
(52) U.S. Cl. ............................................. 324/307; 324/309
(58) Field of Search .................................... 324/307, 309; 345/473

(56) References Cited

U.S. PATENT DOCUMENTS 5,850,229 * 12/1998 Edelsbrunner et al. ............. 345/473

OTHER PUBLICATIONS

"A Survey of a Fundamental Geometric Data Structure" by Franz Aurenhammer in ACM Computing Surveys, vol. 23, No. 3, Sep. 1991, pp. 345–350.

* cited by examiner

*Primary Examiner*—Christine Oda
*Assistant Examiner*—Tiffany A. Fetzner
(74) *Attorney, Agent, or Firm*—John F. Vodopia

(57) ABSTRACT

The invention relates to an imaging method for medical examinations, notably MR examinations, in which a set of measurement values is acquired from measuring points which are irregularly distributed in the frequency domain (or in the k-space). Before an image in the space domain is generated from these measurement values by a Fourier transformation, the measurement values must be weighted in dependence on the density of the measuring points in the frequency domain. To this end, the measurement values are weighted in conformity with the magnitude of the Voronoi cells.

5 Claims, 4 Drawing Sheets

MAGNETIC RESONANCE IMAGING METHOD FOR MEDICAL EXAMINATIONS

BACKGROUND OF THE INVENTION

1. Field of the Invention

The invention relates to an imaging method for medical examinations which includes the following steps:
acquiring a set of measurement values at measuring points distributed in the frequency domain,
weighting the measurement values in dependence on the density of the measuring points,
generating an image in the space domain by applying a Fourier transformation to the weighted measurement values of the set.

2. Description of Related Art

ISMRM 1996, page 359, discloses a method of this kind for the field of MR examinations (MR=Magnetic Resonance). According to the known method, the weighted measurement values are first convoluted with a gridding kernel so as to enable a Fast Fourier Transformation (FFT) to be carried out. After the FFT, the resultant values must be divided by the Fourier transform of the gridding kernel so as to obtain a perfect image.

In the case of a method in which the measuring points are not equidistantly distributed in the frequency domain, it is necessary to weight the measurement values in dependence on the density of the measuring points (the lower the density, the higher the weight with which a measuring point is taken into account). In the case of such irregular distributions the customary definition of the density as a number of measuring points per space interval does not make sense, because this measure fluctuates as a function of the magnitude of the space interval and an infinitely small space interval cannot be suitably considered. According to the known method, the measuring points are situated on a spiral, or on a plurality of spiral arms, and the density for a measuring point is defined as the content of the surface area enclosed by the perpendicular bisectors to the connecting lines to the preceding and the next measuring points with neighbouring spiral arms. This method is not suitable for sequences of the EPI type or other MR sequences involving a very irregular distribution of the measuring points. During MR examinations such an irregular distribution may also occur due to eddy currents or non-ideal gradient amplifiers or due to the use of methods involving asymmetrical echos.

SUMMARY OF THE INVENTION

Therefore, it is an object of the invention to conceive a method of the kind set forth in such a manner that it operates perfectly, and hence produces high-quality images, also in the case of very irregular distributions of the measuring points. This object is achieved according to the invention in that the measurement values are weighted in conformity with the magnitude of the Voronoi cells enclosing the measuring points associated with the measurement values.

The invention is based on the recognition of the fact that the magnitude of the Voronoi cells enclosing the individual measuring points constitutes a substantially optimum measure of the density of the measuring points at the area of the relevant measuring point. Therefore, when the measurement values acquired at the various measuring points are weighted in conformity with the magnitude of the Voronoi cells, Fourier transformation of the measurement values thus weighted will yield an optimum image.

Voronoi cells are known inter alia from ACM Computing Surveys, Vol. 23, No. 3, September 1991, pp. 345 to 350, and are irregular polygons (in case the measuring points are distributed in a two-dimensional frequency domain) or polyhedrons (for the three-dimensional case). The boundaries of these Voronoi cells enclose all points in the frequency domain which are situated nearer to the relevant measuring point than any other measuring point.

The invention can be used not only for measuring points in the two-dimensional space, but also for measuring point distributions in the three-dimensional or more-dimensional space (for example, for three-dimensional imaging spectroscopy) yielding three-dimensional or more-dimensional images. Therefore, in this context the term "image" is to be interpreted in its broadest sense.

Moreover, the invention is not only suitable for MR examinations but also for X-ray computer tomography (CT). CT images are customarily derived from the measurement values by convolution, but this method fails when the measurement values are not uniformly distributed in space, for example due to mechanical instabilities. In this case a CT image, however, can be reconstructed by means of a Fourier transformation for which the measurement values must be weighted in dependence on their density.

The least amount of calculation work is required when the images are reconstructed from the measurement values by means of a fast Fourier transformation (FFT); however, this implies that the measurement values lie at the grid points of a cartesian grid. A method which includes applying a convolution kernel to the measurement values in order to determine interpolated values at the grid points of a cartesian grid, applying a fast Fourier transformation to the set of measurement values, subjected to the convolution, in order to generate an image, and compensating the convolution-induced modulation of the image values associated with the individual pixels of said image.

The Voronoi cells of measuring points situated at the edge of the frequency domain are not closed at the outside, because no further measurement points are present therebeyond. These measuring points (corresponding to the high-frequency components), therefore, would enter the reconstruction with an excessive weight if the boundary of the frequency space were used as the outer boundary of the Voronoi cells. Artefacts thus induced could be avoided by reconstructing the image exclusively by means of measurement values whose associated measuring points are situated within completely enclosed Voronoi cells, but a part of the measurement values would then be lost to the reconstruction. This can be avoided in the version of the method which includes defining synthetic sampling points which are situated outside the measuring range in the frequency domain and whose position in relation to the externally situated measuring points is determined from the position of these measuring points in relation to the measuring points neighbouring these points in the inwards direction, and deriving the outer boundary of the Voronoi cells enclosing the outer measuring points while taking into account the sampling points.

This invention also includes particular application of the methods described above to an MR examination method and to an MR system.

BRIEF DESCRIPTION OF THE DRAWING

The invention will be described in detail hereinafter with reference to the drawings. Therein.

DETAILED DESCRIPTION OF THE PREFERRED EMBODIMENT

Figure 1:
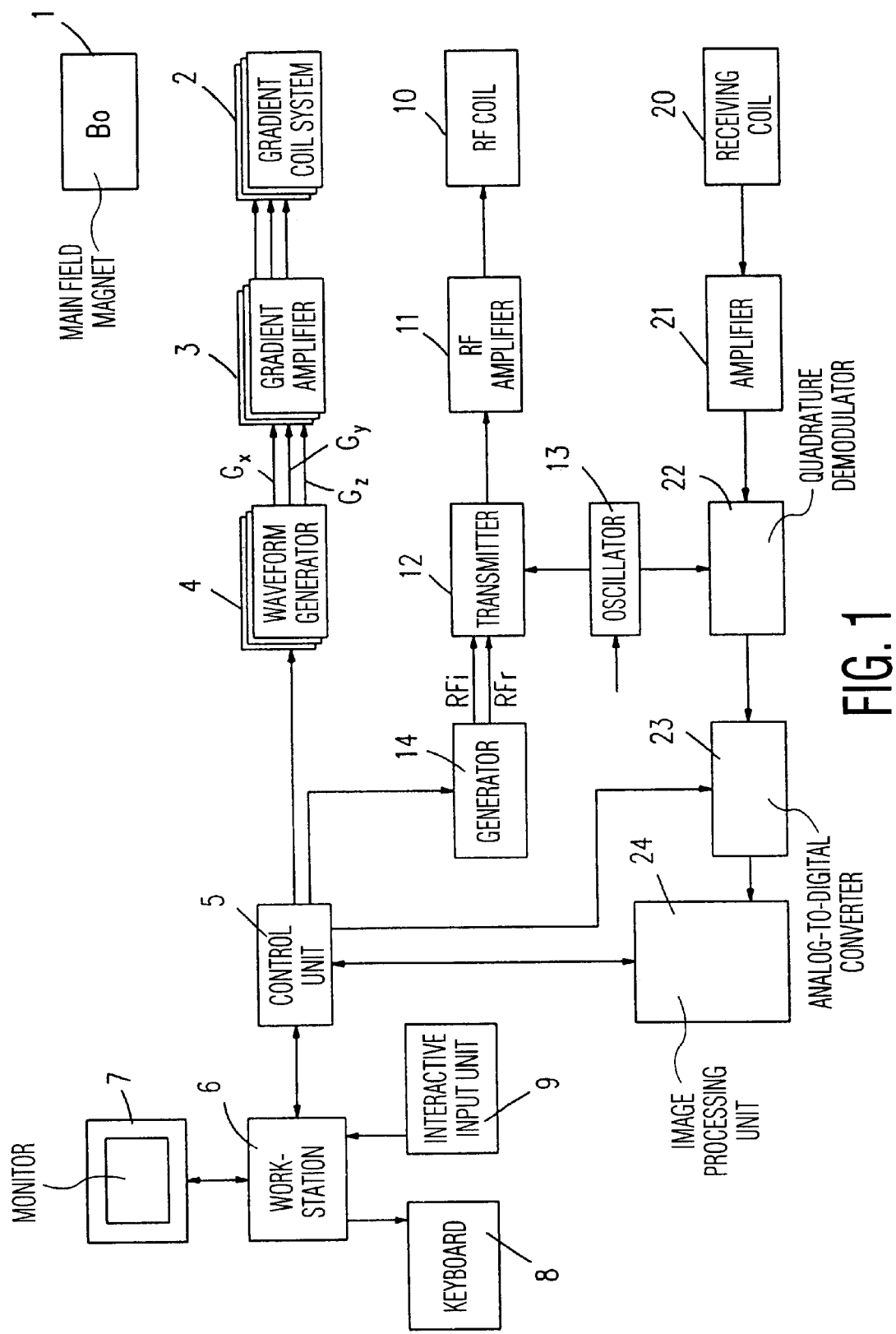
FIG. 1 shows an MR system in which the invention can be used.

The reference numeral 1 in FIG. 1 denotes a main field magnet which generates a steady, essentially uniform magnetic field having a strength of, for example 1.5 Tesla in the z-direction in an examination zone (not shown). The z-direction extends in the longitudinal direction of an examination table (not shown) which accommodates a patient during an examination.

Also provided is a gradient coil system 2 which includes three coil systems whereby magnetic gradient fields $G_x$, $G_y$ and $G_z$ which have a gradient in the x-direction, the y-direction and the z-direction, respectively, and extend in the z-direction can be generated. The currents for the gradient coil system 2 are supplied by a respective gradient amplifier 3. The variation in time thereof is imposed by a waveform generator 4, i.e. separately for each direction. The waveform generator 4 is controlled by an arithmetic and control unit 5 which calculates the temporal variation of the magnetic gradient fields $G_x$, $G_y$, $G_z$ required for a given examination method and loads this variation into the waveform generator 4. During the MR examination, these signals are read out from the waveform generator 4 and applied to the gradient amplifier device 3 which generates the currents required for the gradient coil system 2 therefrom.

The control unit 5 also co-operates with a workstation 6 which includes a monitor 7 for the display of MR images. Entries can be made via a keyboard 8 or an interactive input unit 9.

The nuclear magnetization in the examination zone can be excited by RF pulses from an RF coil 10 which is connected to an RF amplifier 11 which amplifies the output signals of an RF transmitter 12. In the RF transmitter 12 the (complex) envelopes of the RF pulses are modulated with the carrier oscillations which are supplied by an oscillator 13 and whose frequency corresponds to the Larmor frequency (approximately 63 MHz in the case of a main magnetic field of 1.5 Tesla). The arithmetic and control unit loads the complex envelope into a generator 14 which is coupled to the transmitter 12.

The MR signals generated in the examination zone are picked up by a receiving coil 20 and amplified by an amplifier 21. In a quadrature demodulator 22 the amplified MR signal is demodulated by two 90° offset carrier oscillations of the oscillator 13, resulting in two signals which may be considered to be the real part and the imaginary part of a complex MR signal. After conversion into discrete digital values by means of the analog-to-digital converter 23, an MR image (or several MR images) is (are) reconstructed from these MR signals by means of an image processing unit 24. These MR images are displayed on the monitor 7.

Figure 2:
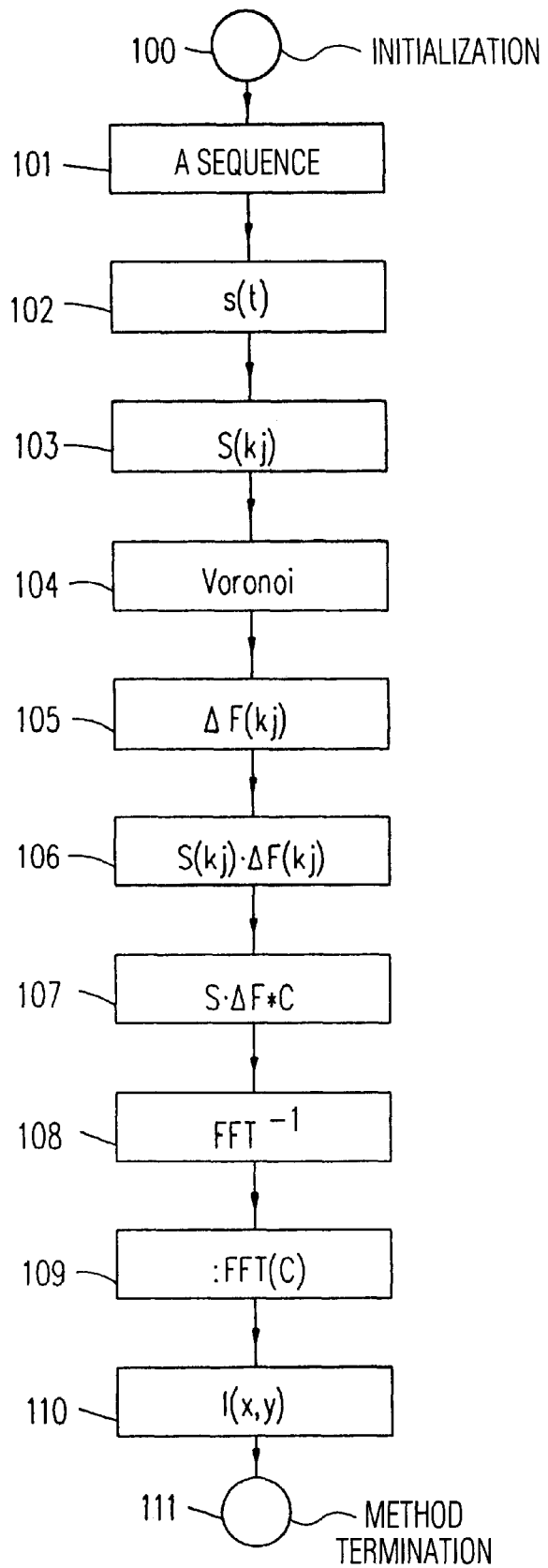
FIG. 2 shows a flow chart of a method according to the invention.

FIG. 2 shows the flow chart of the MR method. After the initialization (100), the nuclear magnetization is excited by a sequence (101) in which not only the steady magnetic field of the main field magnet 1 but also at least one RF pulse from an RF magnetic field and one or more magnetic gradient fields $G_x$, $G_y$ or $G_z$ act on the examination zone in which the patient is arranged.

As a result of such excitation of the nuclear magnetization, an MR signal s(t) arises in the examination zone, which signal is received and digitized by the components 20 ... 23 of the MR system during the step 102. During the step 103 the MR signal is subjected to a (one-dimensional) Fourier transformation, yielding measurement values $S(k_j)$ which represent the nuclear magnetization in the k-space (in the field of MR the k-space is to be understood to mean the frequency domain) at the measuring points $k_j$. If necessary, the steps 101 ... 103 are repeated with modified parameters until the measurement values $S(k_j)$ are available for a number of measuring points $k_j$ which suffices for the image reconstruction. It is important that not only the measurement values $S(k_j)$ are known, but also the measuring points $k_j$.

During the next step a Voronoi diagram is formed in conformity with the measuring points $k_j$, produced by the steps 101 ... 103, for the part of the frequency domain which is intended to contribute to the MR image to be generated, i.e. the Voronoi cells enclosing the respective measuring point are determined (104) for all measuring points. This will be explained in detail with reference to FIG. 3 which shows the Voronoi cells of some measuring points $k_1$, $k_2$, $k_3$ and $k_4$. The measuring points are shown as dots in FIG. 3, whereas the Voronoi cells (and the boundary of the frequency domain) are represented by solid lines.

Figure 3:
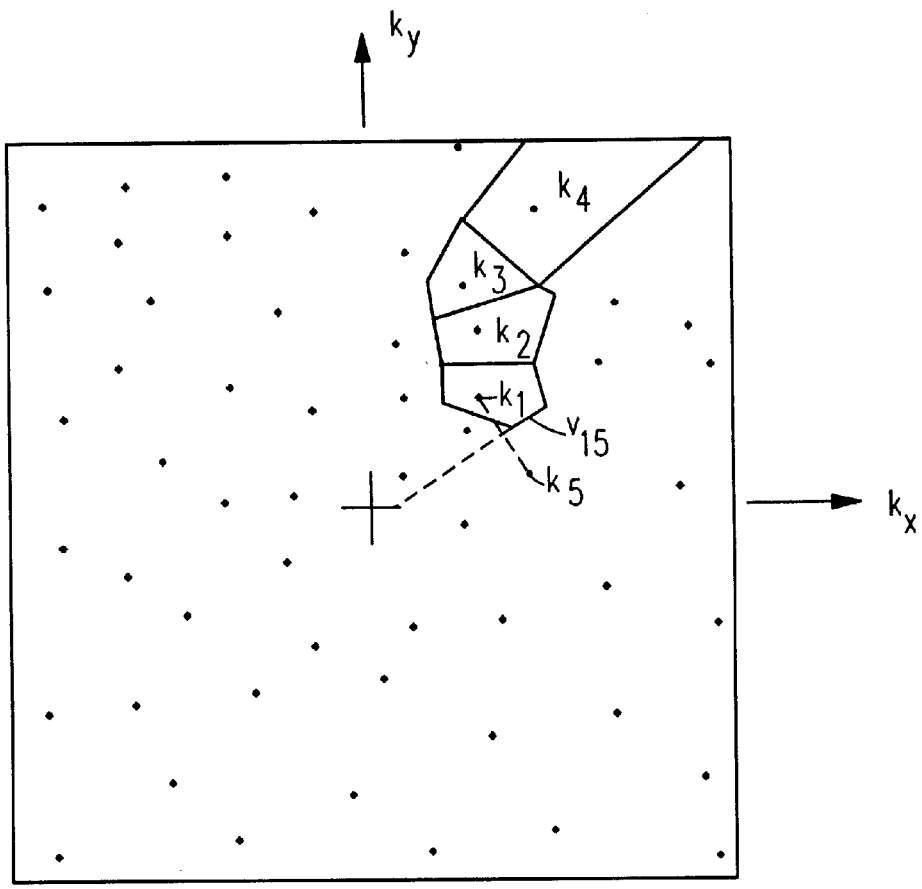
FIG. 3 shows a Voronoi diagram for the measuring points in the frequency domain.

The Voronoi cells are irregular polygons which may have a different number of sides, depending on the configuration of the measuring points situated in the vicinity. Each side of a Voronoi cell is a segment of a perpendicular bisector to the connecting line of two measuring points. In FIG. 3 this is shown for the side $v_{15}$ between the points $k_1$ and $k_5$. The part of the perpendicular bisector associated with the Voronoi cell terminates at the location in which it is intersected by other perpendicular bisectors. All points on a side of a Voronoi cell are situated at the same distance from two measuring points (for example, $k_1$ and $k_5$). All corner points of the Voronoi cells are situated at the same distance from at least three measuring points. All points of a Voronoi cell are situated at a smaller distance from the measuring point situated therein than from any other measuring point.

It follows from the foregoing that the Voronoi cells are smaller as the measuring points are situated nearer one another, meaning that the magnitude of the Voronoi cells (their surface area) is a suitable measure of the density of the measuring points. Therefore, optimum reconstruction is achieved when each measurement value $S(k_j)$ is weighted with the surface area $\Delta F(k_j)$ of the Voronoi cell which encloses the measuring point $k_j$ associated with the respective measurement value.

However, FIG. 3 also shows that the cell for the measuring point $k_4$, situated at the edge, is disproportionally large. The same would also occur for the other measuring points at the edge which represent the high spatial frequency components. This is due to the fact that the external boundary of these cells is formed exclusively by the boundaries of the k-space. In order to ensure that the measurement values at these edges of the k-space do not enter the reconstruction with an excessive weight, which would lead to clearly visible image artefacts, therefore, it is also necessary to find boundaries for the cells enclosing these measuring points so that the surface area of these cells is a suitable measure of the density of the measuring points in this zone.

Figure 4:
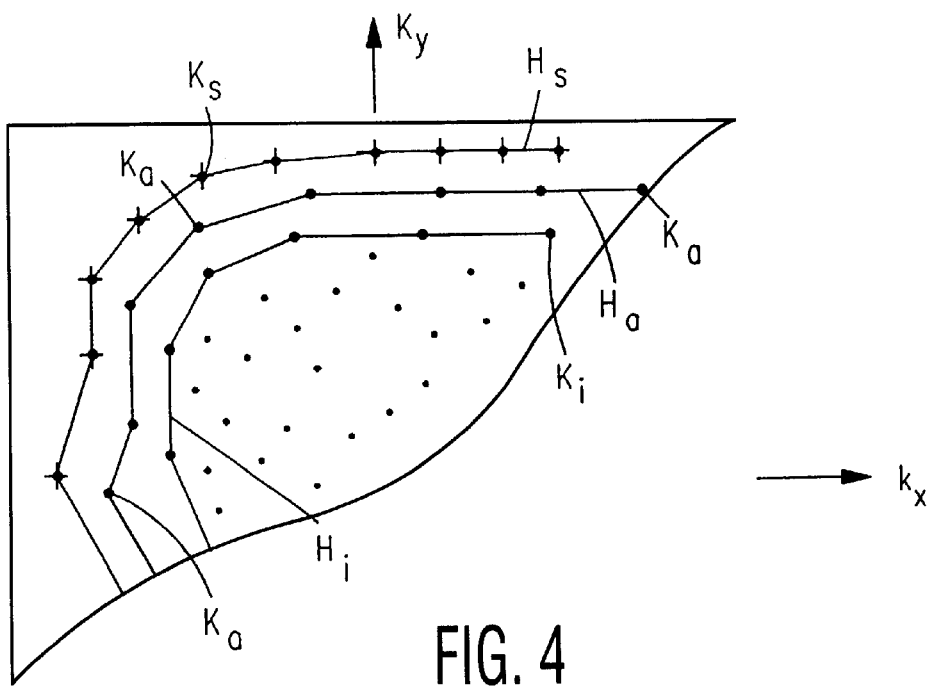
FIG. 4 shows a part of the frequency domain.

One possibility in this respect is indicated in FIG. 4 which shows a sub-zone of the k-space. The measuring points situated at the edge are denoted by the reference $k_a$. When these measuring points are interconnected via straight lines, an envelope $H_a$ is formed which encloses all other measuring points. Let the surface area of this envelope be $F_a$. When all measuring points $k_a$ situated at the edge are assumed to be absent, their neighbouring measuring points $k_i$ become edge points and the straight lines interconnecting these points form an envelope $H_i$ which encloses all other measuring points. When its surface area is denoted by the reference $F_i$, a factor $\alpha$ can be defined as:

$$\alpha = \sqrt{F_a/F_b} \qquad (1)$$

Expanding the outer envelope $H_a$ in conformity with the factor $\alpha$ (in relation to the centroid of this envelope) yields a synthetic envelope $H_s$ with synthetic sampling points $k_s$ which can be used for extrapolation of the outer boundary of the Voronoi cells for the measuring points at the edge.

After a Voronoi cell has thus been formed for all measuring points, the surface areas of these cells are calculated in the step 105 and the measurement value $S(k_j)$ is weighted with $\Delta F(k_j)$ in the step 106.

By using a discrete Fourier transformation an MR image could in principle be formed already on the basis of the weighted MR measurement values thus acquired. The amount of calculations required for this purpose, however, is comparatively large. It can be significantly reduced by acquiring the MR signal from a Fast Fourier Transformation (FFT). To this end, however, it is necessary to know the nuclear magnetization distribution at sampling points which are uniformly distributed in the k-space. The necessary conversion to the grid points of a cartesian grid, the so-called gridding, is performed in conformity with the relation:

$$S_c(k_n) = \sum_n S(k_j) C(k_n - k_j) \Delta F(k_j) \qquad (2)$$

Equation 2 represents the convolution of the measurement values $S(k_j)$, weighted with the quantity $\Delta F(k_j)$, with the convolution kernel $C(k_n-k_j)$, the index n representing the sampling points of the cartesian grid and the index j the irregularly distributed measuring points. $S_c(k_n)$ is the value of the nuclear magnetization determination in the k-space as determined for the sampling point $k_n$.

Figure 5:
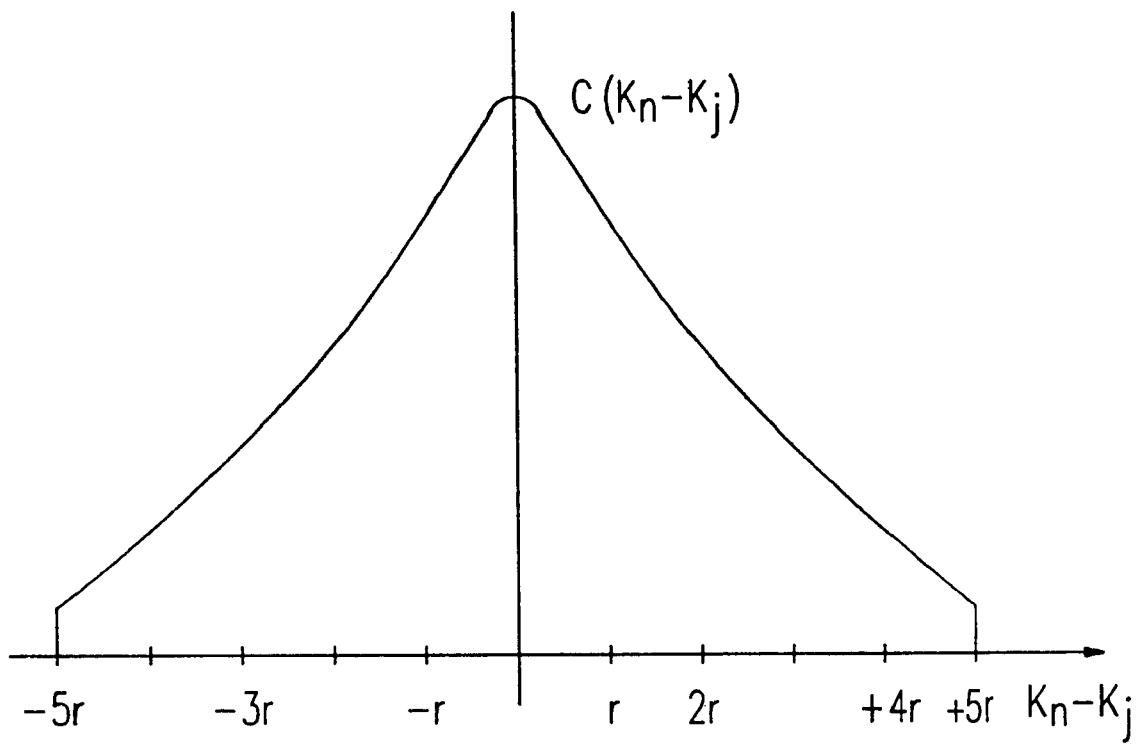
FIG. 5 shows the convolution kernel with which the measurement values are convoluted.

FIG. 5 shows the variation of the convolution kernel $C(k_n-k_j)$ as a function of the difference $k_n-k_j$ (which is to be considered as a vector which connects the sampling point $k_n$ in the k-space to the measuring point $k_j$). The convolution kernel is a symmetrical, bell shaped function shown in FIG. 5 extending between $-5r$ and $5r$. $C(k_n-k_j)$ has the value zero for large values of the difference $k_n-k_j$. In conjunction with FIG. 5 the equation 1 teaches that the calculation of a sampling value $S_c(k_n)$ at the sampling point $k_n$ requires the use of only those measurement values $S(k_j)$ which are situated within a circular window around the sampling point $k_n$. Instead of a circular window a square window, having the shape shown in FIG. 5 in the directions $k_x$ and $k_y$, can be selected. The window may also be wider or narrower than shown in FIG. 5. A window having a width of from 4r to 6r, however, is proven to offer satisfactory results in practice. An excessively large window requires long calculation times, without the image being improved. If the window is too small, there is a risk of artefacts in the image due to a cyclical back-convolution.

In conformity with the equation (2) in step 107 the convolution is executed for all points $k_n$ of the cartesian grid. However, instead of calculating the sum one grid point after the other in conformity with the equation (2), it is effective to calculate the contribution of all measurement values or measuring points $k_j$ to the sampling values at the sampling points $k_n$ successively and to add these contributions to the sum of the already available contributions by other measuring points.

The sampling values $S_c(k_n)$ at the sampling points $k_n$, thus calculated from the measurement values of the nuclear magnetization at the irregularly distributed measuring points $k_j$, can be subjected (step 108) to an (inverse) Fast Fourier Transformation (FFT), yielding the MR image I(x,y) multiplied by the Fourier transform of the convolution kernel $C(k_n-k_j)$. In order to eliminate this weighting of the MR image (with the Fourier transform of the kernel $C(k_n-k_j)$), the resultant distribution is divided by the Fourier transform of the convolution kernel one pixel after the other. In order to avoid a division by the value zero, it must be ensured that the Fourier transform of the convolution kernel deviates from zero throughout the image space. This can be achieved by making the convolution kernel deviate from zero only in comparatively small window as has already been explained.

After the division step 109, the MR image I(x,y) can displayed on the monitor (step 110), thus terminating the execution of the method (step 111).

The steps 107 (gridding) and 109 (division by the Fourier transform of the convolution kernel) can in principle be omitted if, instead of the fast Fourier transformation a discrete Fourier transformation is executed over the measurement values acquired at irregularly distributed measuring points in the step 108. However, execution of the method then requires a substantially longer period of time.

The steps 104 to 110 can also be applied to a set of measurement values $S(k_j)$ which is three-dimensionally distributed in the k-space. The Voronoi cells which are shaped as polygons in the two-dimensional case are then shaped as polyhedrons and the measurement values $S(k_j)$ must then be weighted with the volume content of these polyhedrons.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A magnetic resonance (MR) imaging method for medical examinations comprising:

acquiring a set of k-space measurement values at measuring points ($k_j$) distributed in the frequency domain, weighting the measurement values ($S(k_j)$) as a function of the density of the measuring points, generating an image in k-space by applying a Fourier transformation to the weighted measurement values of the set, wherein the measurement values are weighted in conformity with the magnitude ($\Delta F(k_j)$) of Voronoi cells enclosing the k-space measuring points associated with the k-space measurement values.

2. An imaging method as claimed in claim 1 wherein applying a Fourier transform further comprises:

applying a convolution kernel ($C(k_n-k_j)$) to the weighted measurement values ($S(k_j)$) in order to determine interpolated values ($S(k_n)$) at the grid points ($k_n$) of a cartesian grid, applying a fast Fourier transformation to the set of weighted measurement values, subjected to the convolution, in order to generate an image, and compensating the convolution-induced modulation of the image values associated with the individual pixels of said image.

3. An imaging method as claimed in claim 1 further comprising:

defining synthetic sampling points ($k_s$) which are situated outside the measuring range in the frequency domain and whose position in relation to externally situated measuring points ($k_a$) is determined from the position of these measuring points in relation to measuring points ($k_i$) neighbouring these points in the inwards direction, and deriving the outer boundary of the Voronoi cells enclosing the externally situated measuring points while taking into account the synthetic sampling points.

4. An imaging MR method comprising:

generating at least one MR sequence for exciting the nuclear magnetization in an examination zone, receiving the MR signals generated in the examination zone by the excited nuclear magnetization, discretization and Fourier transformation of the received MR signals in order to extract measurement values in the frequency domain, and generating an image in the space domain from the measurement values in the frequency domain by a method as claimed in claim 1.

5. An MR system comprising:

a main field magnet for generating a uniform, steady magnetic field, gradient coil systems for generating magnetic gradient fields having gradients extending in different directions, an RF coil system for exciting nuclear magnetization in a slice of an examination zone by means of at least one RF pulse, a receiver for receiving the MR signals generated in the examination zone by the excited nuclear magnetization, means for discretizing the received MR signals, and a reconstruction unit for the reconstruction of the nuclear magnetization distribution in the examination zone on the basis of the discretized MR signals, including means for performing a first Fourier transformation so as to acquire MR measurement values in the frequency domain, means for weighting the measurement values in conformity with the magnitude of the Voronoi cells enclosing the individual measuring points, and means for forming an image in the space domain by applying a Fourier transformation to the weighted measurement values of the set.

* * * * *